US009694727B2

(12) United States Patent
Haller et al.

(10) Patent No.: US 9,694,727 B2
(45) Date of Patent: Jul. 4, 2017

(54) DEVICE FOR DAMPING AN UPPER SUSPENSION PART IN AT LEAST ONE SPATIAL DIRECTION WITH RESPECT TO A LOWER SUSPENSION PART MOVABLE RELATIVE THERETO

(71) Applicant: GRAMMER AG, Amberg (DE)

(72) Inventors: Erwin Haller, Birgland (DE); Jens Kolb, Koenigstein (DE)

(73) Assignee: Grammar AG, Amberg (DE)

( * ) Notice: Subject to any disclaimer, the term of this patent is extended or adjusted under 35 U.S.C. 154(b) by 0 days.

(21) Appl. No.: 14/609,618

(22) Filed: Jan. 30, 2015

(65) Prior Publication Data
US 2015/0232004 A1    Aug. 20, 2015

(30) Foreign Application Priority Data

Feb. 20, 2014   (DE) .................. 10 2014 002 210

(51) Int. Cl.
*B60N 2/50*    (2006.01)
*B60N 2/52*    (2006.01)
(Continued)

(52) U.S. Cl.
CPC .......... *B60N 2/505* (2013.01); *B60N 2/0244* (2013.01); *B60N 2/162* (2013.01); *B60N 2/164* (2013.01);
(Continued)

(58) Field of Classification Search
CPC ........ B60N 2/50; B60N 2/501; B60N 2/0244; B60N 2/162; B60N 2/507; B60N 2/502; B60N 2/505; B60N 2/525; B60N 2/164
(Continued)

(56) References Cited

U.S. PATENT DOCUMENTS 3,144,270 A * 8/1964 Bilancia ............... B60N 2/2356
248/397
3,163,466 A   12/1964 Radke et al.
(Continued)

FOREIGN PATENT DOCUMENTS

CN    104842825    8/2015
DE    6811419      8/1969
(Continued)

OTHER PUBLICATIONS

U.S. Appl. No. 14/614,744, filed Feb. 5, 2015, Haller et al.
(Continued)

*Primary Examiner* — Muhammad Ijaz
(74) *Attorney, Agent, or Firm* — Sheridan Ross PC

(57) ABSTRACT

The invention relates to a device for damping an upper suspension part in at least one spatial direction with respect to a lower suspension part movable relative thereto, wherein a spring apparatus which acts between the upper suspension part and the lower suspension part is provided for damping, wherein an actuating element is provided by way of which a force can be introduced into the device bidirectionally in the operating direction of the spring apparatus, wherein the actuating element is actuable via a control apparatus, wherein the actuating element comprises a drive, preferably in the form of a rotary field magnet, and a coupling rod, drivable by the drive and in the form of a shaft, in such a way that a distance between the lower suspension part and upper suspension part can be varied as a result of the coupling rod rotating.

13 Claims, 4 Drawing Sheets

(51) Int. Cl.
*B60N 2/16* (2006.01)
*B60N 2/02* (2006.01)

(52) U.S. Cl.
CPC ............ *B60N 2/165* (2013.01); *B60N 2/501* (2013.01); *B60N 2/502* (2013.01); *B60N 2/508* (2013.01); *B60N 2/525* (2013.01); *B60N 2002/0236* (2013.01)

(58) Field of Classification Search
USPC ........................ 248/421, 550, 562, 566, 588; 297/344.15, 344.16
See application file for complete search history.

(56) References Cited

U.S. PATENT DOCUMENTS

| | | | | |
|---|---|---|---|---|
| 3,874,626 | A * | 4/1975 | Gross | B60N 2/14 248/421 |
| 3,888,451 | A | 6/1975 | Lacey | |
| 4,461,444 | A * | 7/1984 | Grassl | B60N 2/501 248/430 |
| 4,611,783 | A | 9/1986 | Sakamoto | |
| 4,638,982 | A * | 1/1987 | Misher | B60N 2/501 248/550 |
| 4,640,488 | A | 2/1987 | Sakamoto | |
| 4,685,731 | A * | 8/1987 | Migut | B60N 2/164 108/147 |
| 4,885,918 | A * | 12/1989 | Vaccaro | A61G 11/002 182/141 |
| 4,941,641 | A | 7/1990 | Granzow et al. | |
| 5,169,112 | A * | 12/1992 | Boyles | B60N 2/501 248/406.2 |
| 5,176,355 | A * | 1/1993 | Carter | B60N 2/502 248/550 |
| 5,251,864 | A * | 10/1993 | Itou | B60N 2/502 248/588 |
| 5,273,275 | A * | 12/1993 | Wilkerson | A63B 63/083 473/433 |
| 5,364,060 | A * | 11/1994 | Donovan | B60N 2/502 248/421 |
| 5,642,916 | A * | 7/1997 | Dybro | B60N 2/4221 296/68.1 |
| 5,954,400 | A * | 9/1999 | Brodersen | B60N 2/502 248/280.11 |
| 5,957,426 | A | 9/1999 | Brodersen | |
| 5,975,508 | A * | 11/1999 | Beard | B60N 2/501 180/89.12 |
| 6,264,163 | B1 * | 7/2001 | Ivarsson | B60N 2/501 248/550 |
| 6,705,238 | B1 * | 3/2004 | Heckert | B66F 7/065 108/145 |
| 7,568,675 | B2 | 8/2009 | Catton | |
| 7,637,360 | B2 | 12/2009 | Carlson et al. | |
| 7,770,974 | B2 | 8/2010 | Ott et al. | |
| 7,810,884 | B2 | 10/2010 | Lorey et al. | |
| 7,975,813 | B2 | 7/2011 | Spangler et al. | |
| 8,342,541 | B2 * | 1/2013 | Wurmthaler | B60N 2/501 248/636 |
| 8,585,004 | B1 * | 11/2013 | Roeglin | F16M 11/18 248/421 |
| 8,931,750 | B2 | 1/2015 | Kohl et al. | |
| 2003/0075401 | A1 | 4/2003 | Carlson | |
| 2004/0090100 | A1 * | 5/2004 | Igarashi | B60N 2/502 297/344.15 |
| 2004/0159763 | A1 * | 8/2004 | Mullinix | B60N 2/501 248/421 |
| 2006/0237885 | A1 * | 10/2006 | Paillard | B60N 2/501 267/140.15 |
| 2008/0015753 | A1 * | 1/2008 | Wereley | B60N 2/4242 701/45 |
| 2008/0042480 | A1 * | 2/2008 | Volkman | B60N 2/14 297/344.21 |
| 2008/0197684 | A1 * | 8/2008 | Ott | B60N 2/501 297/344.16 |
| 2009/0134595 | A1 * | 5/2009 | Haller | B60G 17/0155 280/124.157 |
| 2010/0102493 | A1 | 4/2010 | Deml et al. | |
| 2010/0122881 | A1 | 5/2010 | Carlson et al. | |
| 2010/0133413 | A1 * | 6/2010 | Wahls | B60N 2/502 248/566 |
| 2010/0224343 | A1 * | 9/2010 | Fukuma | B25J 19/0054 165/67 |
| 2010/0332079 | A1 * | 12/2010 | Wang | B60N 2/4242 701/37 |
| 2011/0001342 | A1 * | 1/2011 | Deml | B60N 2/502 297/338 |
| 2011/0024958 | A1 | 2/2011 | Deml et al. | |
| 2012/0001467 | A1 * | 1/2012 | Teufel | B60N 2/0232 297/337 |
| 2012/0001468 | A1 * | 1/2012 | Schuler | B60N 2/502 297/344.16 |
| 2012/0090930 | A1 * | 4/2012 | Haller | B60N 2/502 188/280 |
| 2012/0097822 | A1 * | 4/2012 | Hammarskiold | B60N 2/502 248/421 |
| 2012/0187615 | A1 | 7/2012 | Haller et al. | |
| 2013/0153320 | A1 | 6/2013 | Contratto et al. | |
| 2013/0158791 | A1 * | 6/2013 | Contratto | B60N 2/501 701/36 |
| 2013/0168624 | A1 * | 7/2013 | Shin | B60N 2/502 254/93 R |
| 2013/0206949 | A1 * | 8/2013 | Archambault | B60N 2/508 248/421 |
| 2013/0264455 | A1 | 10/2013 | Robbins et al. | |
| 2015/0021965 | A1 * | 1/2015 | Ellerich | B60N 2/682 297/283.1 |
| 2015/0158404 | A1 * | 6/2015 | Pylypenko | B60N 2/525 248/575 |
| 2015/0232004 | A1 * | 8/2015 | Haller | B60N 2/501 248/562 |
| 2015/0232005 | A1 * | 8/2015 | Haller | B60N 2/505 248/562 |
| 2016/0200230 | A1 * | 7/2016 | Haller | B60N 2/501 296/190.08 |
| 2016/0214658 | A1 * | 7/2016 | Haller | B60N 2/501 |

FOREIGN PATENT DOCUMENTS

| | | |
|---|---|---|
| DE | 7115795 | 7/1971 |
| DE | 2446515 | 4/1976 |
| DE | 2704921 | 8/1978 |
| DE | 2707184 | 8/1978 |
| DE | 7835259 | 5/1979 |
| DE | 2849700 | 5/1980 |
| DE | 3227858 | 1/1984 |
| DE | 3242287 | 5/1984 |
| DE | 3517505 | 11/1986 |
| DE | 4025183 | 11/1991 |
| DE | 4335199 | 5/1995 |
| DE | 10354635 | 6/2005 |
| DE | 102006017774 | 10/2007 |
| DE | 102010026015 | 1/2012 |
| EP | 0002332 | 8/1981 |
| FR | 2208353 | 6/1974 |
| FR | 2286022 | 4/1976 |
| JP | 2009-228723 | 10/2009 |
| WO | WO 8809270 | 12/1998 |

OTHER PUBLICATIONS

Official Action for U.S. Appl. No. 12/826,232, mailed Sep. 20, 2012, 12 pages.
Final Action for U.S. Appl. No. 12/826,232, mailed Mar. 13, 2013, 12 pages.
Official Action for U.S. Appl. No. 12/826,232, mailed Jun. 26, 2013, 7 pages.
Final Action for U.S. Appl. No. 12/826,232, mailed Dec. 27, 2013, 11 pages.
Official Action for U.S. Appl. No. 12/826,232, mailed Jun. 20, 2014, 6 pages.

(56) References Cited

OTHER PUBLICATIONS

Notice of Allowance for U.S. Appl. No. 12/826,232, mailed Aug. 29, 2014, 7 pages.
Examiner's Report including English translation for German Application No. 102014002210.2, dated, Jan. 7, 2015, 13 pages.
Extended Search Report for European Patent Application No. 14194426.4, dated Oct. 9, 2015, 3 pages.
Extended Search Report for European Patent Application No. 14194425.6, dated Oct. 9, 2015, 3 pages.
Final Action for U.S. Appl. No. 14/614,744, mailed Dec. 12, 2016 18 pages.
Official Action for U.S. Appl. No. 14/614,744, mailed Apr. 1, 2016 6 pages Restriction Requirement.
Official Action for U.S. Appl. No. 14/614,744, mailed Jun. 17, 2016 12 pages.

\* cited by examiner

DEVICE FOR DAMPING AN UPPER SUSPENSION PART IN AT LEAST ONE SPATIAL DIRECTION WITH RESPECT TO A LOWER SUSPENSION PART MOVABLE RELATIVE THERETO

CROSS-REFERENCE TO RELATED APPLICATION

This application claims the benefit of German Application No. 10 2014 002 210.2 filed Feb. 20, 2014, the contents of which are incorporated herein by reference.

FIELD

The invention relates to a device for damping an upper suspension part in at least one spatial direction with respect to a lower suspension part movable relative thereto.

BACKGROUND

Devices of this type are often used to damp vehicle seats during operation of a vehicle. In this context, the upper suspension part is connected to the seat surface of the vehicle seat, whilst the lower suspension part is arranged fixed in place on the vehicle or the body thereof, respectively.

However, in devices of this type for damping an upper suspension part with respect to a lower suspension part, it is problematic that during the operation of the device, in particular in a vehicle seat, temporary deviations from a pre-set distance between the lower and upper suspension face occur as a result of forces introduced into the device.

SUMMARY

An object of the invention is therefore to further develop a device of the aforementioned type in such a way that deviations of this type during the operation of the device are minimized.

This object is achieved by a device having all of the features of claim 1. Advantageous configurations of the device may be found in dependent claims 2 to 7. This object is further achieved by a seat having all of the features of claim 8 and a vehicle having all of the features of claim 9.

The device according to the invention for damping an upper suspension part in at least one spatial direction with respect to a lower suspension part movable relative thereto, in which a spring apparatus which acts between the upper suspension part and the lower suspension part is provided for damping, therefore comprises an actuating element by way of which a force can be introduced into the device bidirectionally in the operating direction of the spring apparatus, this actuating element being actuable via a control apparatus, the actuating element comprising a drive, preferably in the form of a rotary field magnet, and a coupling rod, drivable by the drive and in the form of a shaft, in such a way that a distance between the lower suspension part and upper suspension part can be varied as a result of the rotation of a coupling rod. In a vehicle seat, a force of this type which can be introduced bidirectionally will generally be introducible in a positive and negative Z direction or vehicle vertical direction, respectively. However, it is also conceivable, in particular if this device is used in a vehicle seat, alternatively or additionally to introduce bidirectional forces of this type both in the positive and negative X or longitudinal direction, respectively and in the positive and negative Y or width direction, respectively.

As a result of the configuration according to the invention of the device, it is now possible to control the device actively, bidirectionally in the operating direction of the spring apparatus, via the actuating element, in such a way that the actuating element on the one hand brings about levelling in the event of temporary deviations in the distance between the lower and upper suspension face and on the other hand brings about an active engagement in isolating oscillations.

In this context, the actuating element comprises a drive, preferably configured as a rotary field magnet, and a coupling rod, drivable by the drive and preferably in the form of a shaft, in such a way that a distance between the lower suspension part and upper suspension part can be varied as a result of the coupling rod being rotated by the drive or the rotary field magnet, respectively. As a result of the drive and the coupling rod coupled thereto, it is now possible actively to counter movements which occur during the operation of the device. In particular the configuration of the drive as a rotary field magnet, also known as a torque motor, is particularly advantageous, since a rotary field magnet of this type can also produce a standstill torque in long-term operation.

In this respect, it has been found to be advantageous to select the coupling rod in the form of shaft in such a way that the drive of the coupling rod in the form of a shaft can be produced by both the drive in the form of a rotary field magnet and the spring apparatus. In this case, there is never any self-locking by way of the coupling rod in the form of a shaft.

In accordance with a further inventive idea, the spring apparatus comprises a spring, which is arranged between the upper suspension part and the lower suspension part which is preferably in the form of an air spring, and a scissor-type support apparatus, which connects the upper suspension part to the lower suspension part such that they are movable relative to one another. A configuration of this type of the device according to the invention is particularly suitable for an application as suspension for a seat, in particular for a vehicle seat. The device according to the invention can thus be arranged between the seat surface and the vehicle body in a simple and compact manner, in such a way that it does not require any additional space.

In this respect, it has been found to be advantageous for the scissor-type support apparatus to comprise a first scissors, consisting of a first inner link and a first outer link, and a second scissors, consisting of a second inner link and a second outer link, which are preferably interconnected via at least one transverse connection. As a result of this configuration of the invention, it is possible to configure the device particularly stably in the operating direction of the spring, in such a way that even tilting movements of the upper suspension face with respect to the lower suspension face are effectively prevented as a result.

In this context, the drive may be fixedly arranged on the upper suspension part or lower suspension part, respectively, and the coupling rod in the form of a shaft may be in the form of a fixed bearing transverse connection between the first inner link and the second inner link or between the first outer link and the second outer link, and may be mounted rotatably in a fixed bearing.

In accordance with a particularly advantageous inventive idea, the coupling rod in the form of a shaft is formed spring-loaded using at least one spring element. As a result of this configuration of the invention, when a force is introduced into the device according to the invention, the at least one spring element of the coupling rod is initially biased and the drive is only subsequently activated. As a result of this coupling of the drive to a coupling rod which is configured with at least one spring and is in the form of a shaft, permanent entrainment of the drive in rotation can be prevented, in particular in the high-frequency or short-stroke operating range of the device according to the invention. As a result of the superposition of different provided spring characteristics—on the one hand the spring of the spring apparatus and on the other hand this at least one spring element of the coupling rod formed as a shaft—a wide spectrum for the introduction frequencies to be isolated is achieved. In this respect the usable field of forces consists of the spring rate of the spring apparatus and the spring rate of the at least one spring element, serving as a decoupling spring, of the coupling rod as well as of the force spectrum of the drive. In this context, the spring of the spring apparatus, which in the present case merely acts as a passive component, is used as a basis for receiving the base load which acts on the device according to the invention as a mass. In this context, when the device according to the invention is first used, a load of a predetermined force is raised to a predetermined distance level between the lower and upper suspension faces. The available force of the drive can now be produced in both directions of the operating direction of the spring apparatus by way of the drive in the form of a rotary field magnet. During the operation of the device according to the invention, this force of the drive is used to correct temporary distance deviations between the lower and upper suspension faces, in such a way that as a result of the device according to the invention the predetermined distance between the lower and upper suspension face is permanently aimed for and merely minimal deviation therefrom occurs.

In this respect it has been found to be advantageous for at least one movement sensor to be provided, by means of which the movements of the upper suspension part with respect to the lower suspension part in the at least one spatial direction can be detected. The data detected by the movement sensor can in this respect preferably be passed on to the control apparatus. As a result of this movement sensor, which may be formed as a path sensor or angle sensor, the dynamics, in other words the movement of the lower suspension face with respect to the upper suspension face, are detected and passed on to the control apparatus. In this respect, the measurement range corresponds to the total stroke of the spring apparatus. During active control of the device according to the invention, the entire force spectrum of the drive or of the rotary field magnet, respectively, is in this respect made use of so as to influence introductions of force into the device according to the invention.

The device according to the invention can thus both act together with the introduction of force, in other words the supporting force for the upper suspension side to carry a mass is reduced, and counter the introduction of force, in which case the force counter to the introduction of force is increased.

The high-frequency control which is required for influencing the oscillations is in this respect provided by way of the changes in the supplied current or in the direction of rotation of the drive, respectively or the rotary field magnet, respectively. The type and intensity of the control is in this respect stored in a control algorithm of the control apparatus. The type and intensity of the force introduction are detected by the device according to the invention by way of the acceleration reader, which is fixed to the lower suspension part, and the movement sensor, which evaluates the distance or the deviation thereof, respectively, between the upper suspension part and the lower suspension part.

In accordance with a further inventive idea, a shock absorber is provided for damping oscillations of the spring apparatus.

The invention also further relates to a seat, in particular a vehicle seat, comprising an above-described device according to the invention, and also to a vehicle comprising at least one seat of this type or comprising at least one above-described device according to the invention, respectively.

Further aims, advantages, features and possible applications of the present invention may be seen from the following description of embodiments by way of the drawings. In this context, all of the features which are described and/or shown in the drawings, in isolation or in any reasonable combination, form the subject matter of the present invention, irrespective of how they are compiled in the claims or the dependencies thereof.

BRIEF DESCRIPTION OF THE DRAWINGS

FIGS. 1 to 4c are various views of an embodiment of a device according to the invention, which is used in a vehicle seat for damping oscillations during the operation of the vehicle.

DETAILED DESCRIPTION

Figure 1:
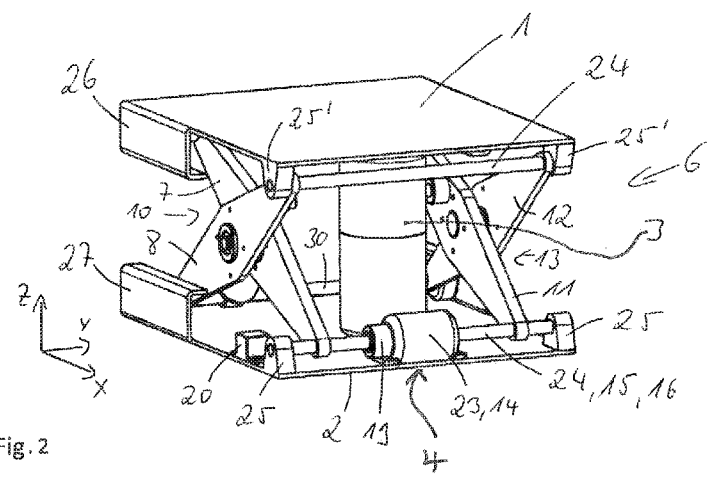
FIG. 1 is a perspective view of an embodiment of a device according to the invention.

In this respect the device comprises an upper suspension face 1 and a lower suspension face 2, between which a spring apparatus 3 is arranged. In the present case, the spring apparatus 3 consists of a scissor-type support apparatus 6 and of a spring 5 in the form of an air spring, by means of which movements in a vertical direction Z can be damped. The scissor-type support apparatus 6 consists of a first scissors 10 and a second scissors 13. In this respect the first scissors 10 consists of a first inner link 7 and a first outer link 8, these being interconnected so as to be pivotable with respect to one another approximately in the centers thereof. The second scissors 13 consists of a second inner link 11 and a second outer link 12, which are likewise interconnected so as to be pivotable with respect to one another approximately in the centers thereof. In this respect the lower ends of the first inner link 7 and the second inner link 11 are arranged fixedly and non-rotatably on a fixed bearing transverse connection 24, which is rotatably mounted in fixed bearings 25 arranged fixedly on the lower suspension face 2. At the upper ends thereof, the first inner link 7 and the second inner link 11 are interconnected by means of a floating bearing transverse connection 31, at the ends of which there are rollers 32 which are guided in guide rails 26 and 28 arranged on the upper vehicle face.

Analogously, at the upper ends thereof, the first outer link 8 and the second outer link 12 are mounted in fixed bearings 25' arranged on the upper suspension face by means of a fixed bearing transverse connection 24'. At the lower ends thereof, the first outer link 8 and the second outer link 12 are interconnected via a further floating bearing transverse connection 30, rollers 33, which are guided in guide rails 27 and 29 arranged on the lower suspension face 2, being arranged at the ends of the floating bearing transverse connection 30.

By means of the entire spring apparatus 6, the distance between the upper suspension face 1 and the lower suspension face 2 can be varied by force input, for example if a force is applied to the device arranged in a vehicle seat by a person sitting down on the vehicle seat.

Since during operation of the device in a vehicle seat oscillations due to irregularities in the road surface on which the vehicle is moving or due to displacement of the weight of the person sitting on the seat vary the force introduced to the device according to the invention during operation of the vehicle, an actuating element 4, by means of which the externally introduced force input into the device can be countered, is provided for compensating this force input.

In the present embodiment, the actuating member 4 consists of a drive 23 in the form of a rotary field magnet 14, by means of which the fixed bearing transverse connection 24, which in the present case is in the form of a coupling rod 16 in the form of a shaft 15, can be rotated. For this purpose, the coupling rod 16 in the form of a shaft 15 comprises, on the circumference thereof, engagement means in which the drive 23 in the form of a rotary field magnet 14 can engage and can thus rotate the coupling rod 16 in the form of a shaft 15. The drive 23 in the form of a rotary field magnet 14 is arranged fixedly on the lower suspension face 2, whilst the coupling rod 16 is mounted rotatably in two fixed bearings 25. Since the coupling rod 16 is fixedly and non-rotatably connected to the inner links 7 and 11 of the scissor-type supports 10 and 13 of the scissor-type support apparatus 6, when the coupling rod 16 is rotated by the rotary field magnet 14 the inner links 7 and 11 of the scissors 10 and 13 are entrained in rotation and the scissors 10 and 13 of the scissor-type support apparatus are thus adjusted to be open, in such a way that the distance between the upper suspension face 1 and the lower suspension face 2 is changed.

To make it possible to detect movements and accelerations of the upper suspension face 1 with respect to the lower suspension face 2, a movement sensor 19, in this case in the form of an angle sensor, and an acceleration sensor 20 are provided. By means of these sensors 19 and 20, the intensity of the introduction of force and the distance or deviations from a predetermined distance, respectively between the upper suspension part 1 and the lower suspension part 2 can be established. In this respect the data detected by the sensors 19 and 20 can be passed on to a control apparatus (not shown here), which supplies the drive 23 or the rotary field magnet 14, respectively, with current and voltage on the basis of the data supplied by the sensors 19 and 20, in such a way that an introduction of force can be countered or promoted, in such a way that the entire system is always urged to take on the predetermined zero position thereof.

Figures 4A, 4B, 4C:
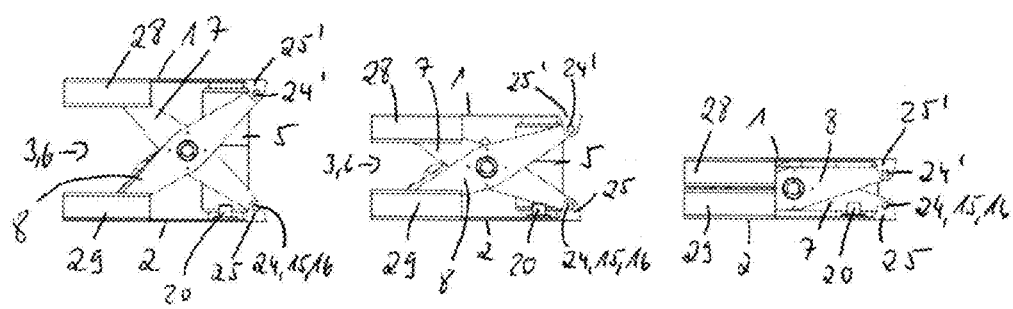
Figure 5:
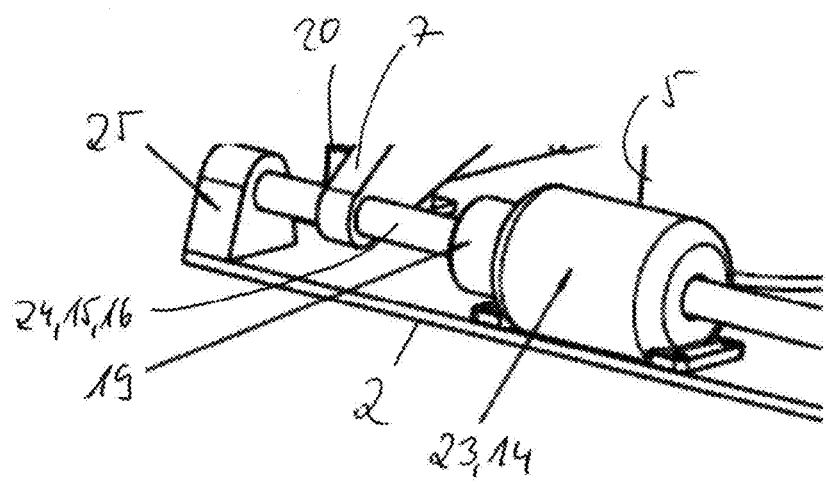
FIG. 5 shows a detail of a device according to the invention in accordance with FIGS. 1 and 2.
Figure 6:
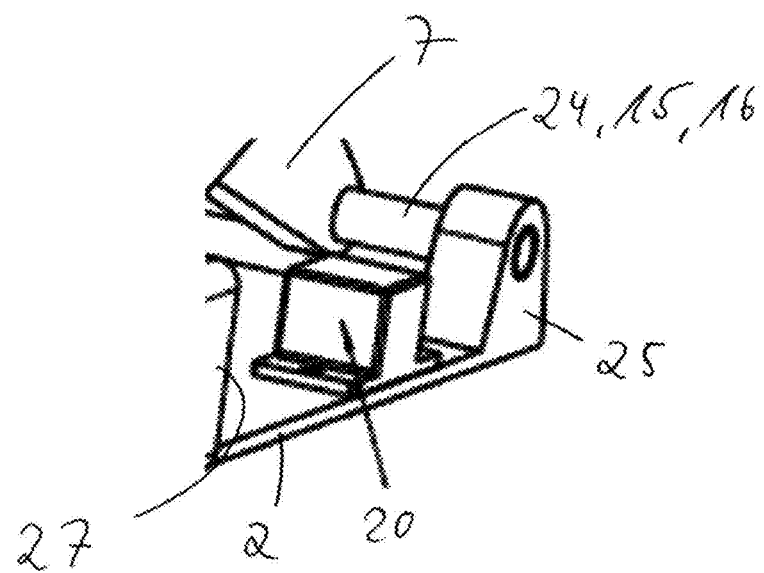
FIG. 6 shows a further detail of a device according to the invention in accordance with FIGS. 1 and 2.

A zero position of this type is shown for example in FIG. 4b, whilst FIG. 4a shows the maximum deflection of the entire system in the positive Z or vertical direction, respectively, and FIG. 4c shows the maximum deflection of the entire system in the negative Z or vertical direction, respectively.

To damp the oscillation introduced into the device according to the invention by the spring apparatus 3 after a force is applied, a shock absorber 21 is provided, one end of which is likewise arranged on the floating bearing transverse connection 30, whilst the other end thereof is arranged in the upper region of the first inner link 7 of the first scissors.

Figure 7:
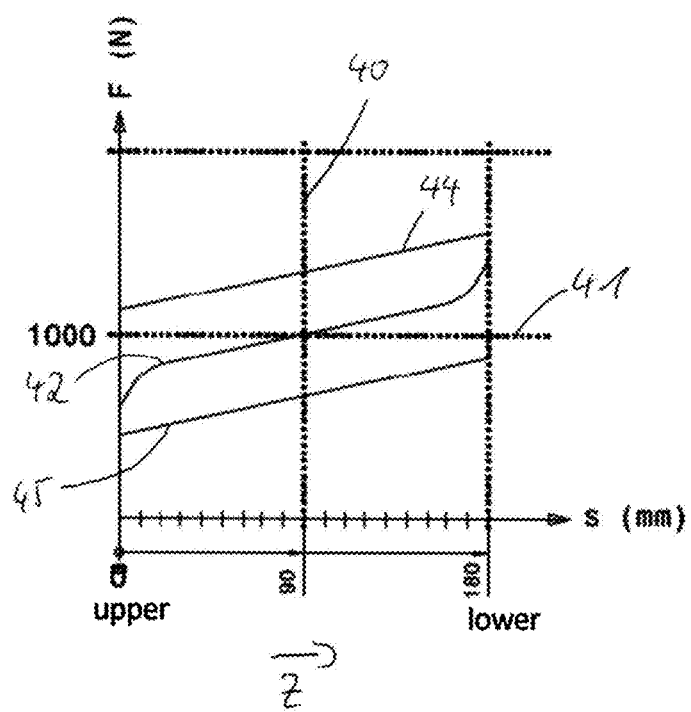
FIG. 7 is a force-deflection graph of a device according to the invention.

FIG. 7 is in this respect a corresponding force-deflection diagram for the actuating element 4 of the embodiment described here.

In this respect reference numeral 42 denotes the spring characteristic of the spring 5. Further, a target level line 40 is shown in the graphs, which is taken on by the device according to the invention when a predetermined weight or a predetermined force, respectively, is applied thereto. For example, the deflection of the upper suspension part 1 or the change in distance between the upper suspension part 1 and the lower suspension part 2, respectively, is approximately 90 mm for an applied force of 1000 N.

In the present embodiment, FIG. 4b shows in this respect the deflection of 90 mm, whilst FIG. 4a shows a deflection of 0 mm and FIG. 4c shows a deflection of 180 mm. In the force-deflection diagram of FIG. 7, reference numeral 41 indicates a target force line, to represent the force of 1000 N. The target force line 41 and the target level line 40 in this respect intersect at an intersection point, through which the spring characteristic 42 of the spring 5 also passes. In this respect, reference numerals 44 and 45 indicate an upper force line and a lower force line. In this respect, the upper force line 44 denotes the force which can be introduced by the actuating element 4 in addition to the force acting on the device, whilst the lower force line 45 indicates a force which counters the force introduced into the device. In the present embodiment, this force to be additionally introduced is approximately 200 N.

Figure 2:
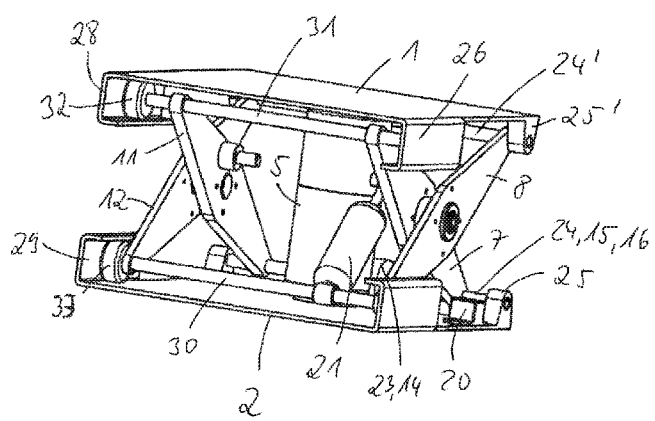
FIG. 2 is a different perspective view of the device according to the invention in accordance with FIG. 1.
Figure 3:
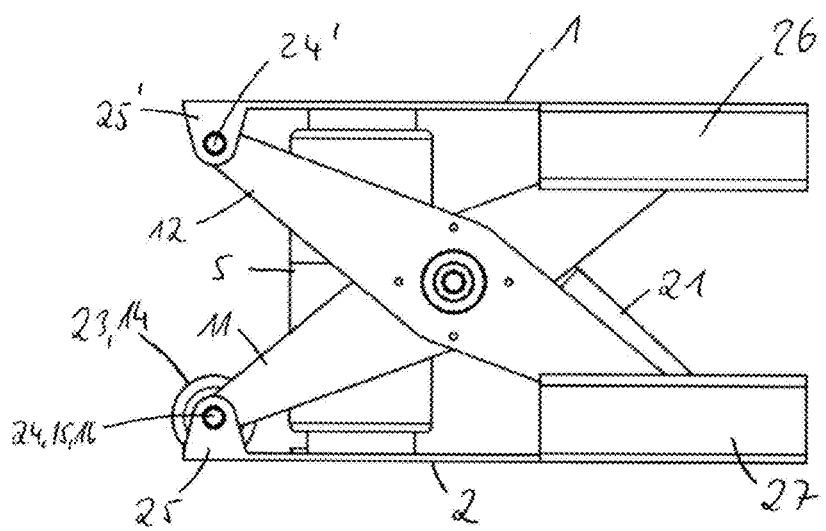
FIG. 3 is a side view of the device according to the invention in accordance with FIGS. 1 and 2, FIGS. 4a to 4c show the device according to the invention of FIGS. 1 to 5 in different loading states.

Thus, by means of the device according to the invention, in particular as shown in FIGS. 1 to 3, the deviation of the upper suspension face 1 from the target level line 40 can be minimized during the operation of the device according to the invention, in such a way that a vehicle seat equipped therewith substantially maintains the position thereof about this target level line 40, with optimum suspension comfort and damping comfort.

LIST OF REFERENCE NUMERALS

1 Upper suspension part
2 Lower suspension part
3 Spring apparatus
4 Actuating element
5 Spring
6 Scissor-type support apparatus
7 First inner link
8 First outer link
10 First scissors
11 Second inner link
12 Second outer link
13 Second scissors
14 Rotary field magnet
15 Shaft
16 Coupling rod
19 Movement sensor
20 Acceleration sensor
21 Shock absorber
23 Drive 24 Fixed bearing transverse connection
24' Fixed bearing transverse connection
25 Fixed bearing
25' Fixed bearing
26 Guide rail
27 Guide rail
28 Guide rail
29 Guide rail
30 Floating bearing transverse connection
31 Floating bearing transverse connection
32 Roller
33 Roller
40 Target level line
41 Target force line
42 Spring characteristic of the spring 5
44 Upper force line
45 Lower force line
X Longitudinal direction
Y Width direction
Z Vertical direction

What is claimed is:

1. A device for damping a vehicle seat, comprising:
an upper suspension part and a lower suspension part, the upper suspension part is configured to dampen oscillations in at least one spatial direction with respect to the lower suspension part and is movable relative thereto,
a spring apparatus which acts between the upper suspension part and the lower suspension part being provided for damping the oscillations,
an actuating element is provided by way of which a force can be introduced into the device bidirectionally in the operating direction of the spring apparatus, the actuating element being actuable via a control apparatus,
the actuating element comprising:
a drive, in the form of a rotary field magnet, positioned in a space defined between a plurality of links of a scissor-type support apparatus, and
a coupling rod, drivable by the drive and in the form of a shaft, extends through the drive and rotates about an axis of the rotary field magnet, the coupling rod is fixedly and non-rotatably connected to lower ends of the plurality of links of the scissor-type support apparatus, and the coupling rod is fixedly and rotatably connected to the lower suspension part,
wherein the control apparatus is configured to actuate the drive, which rotates the coupling rod about the axis and moves the plurality of links so that a distance between the lower suspension part and upper suspension part can be varied as a result of the rotation of the coupling rod,
wherein the actuating element levels temporary deviations in the distance between the lower and upper suspension parts and actively engages in isolating the oscillations.

2. The device according to claim 1, wherein the spring apparatus comprises a spring, which is arranged between the upper suspension part and the lower suspension part, and the scissor-type support apparatus, which connects the upper suspension part to the lower suspension part such that they are movable relative to one another.

3. The device according to claim 2, wherein the scissor-type support apparatus comprises a first scissors, having a first inner link and a first outer link, and a second scissors, having a second inner link and a second outer link, which are preferably interconnected via at least one transverse connection.

4. The device according to claim 3, wherein the drive is fixedly arranged on the upper suspension part or lower suspension part, respectively and the coupling rod in the form of the shaft is in the form of a fixed bearing transverse connection between the first inner link and the second inner link or between the first outer link and the second outer link, and is mounted rotatably in a fixed bearing.

5. The device according to claim 1, wherein at least one movement sensor is provided, which detects the movements of the upper suspension part with respect to the lower suspension part in the at least one spatial direction, which can be passed on to the control apparatus.

6. The device according to claim 1, wherein an acceleration sensor is provided, which detects accelerations between the upper suspension part and the lower suspension part, and can be passed on to the control apparatus.

7. The device according to claim 1, a shock absorber is provided for damping oscillations of the spring apparatus.

8. The device according to claim 1, wherein the plurality of links comprising a plurality of inner links, the drive is positioned in the space defined between the plurality of inner links, and the coupling rod is fixedly and non-rotatably connected to the plurality of inner links of the scissor-type support apparatus.

9. The device according to claim 1, wherein the drive rotates the coupling rod about the axis in a first direction to decrease the distance between the lower suspension part and the upper suspension part, and the drive rotates the coupling rod about the axis in a second direction to increase the distance between the lower suspension part and the upper suspension part.

10. A device, comprising:
an upper suspension part;
a lower suspension part, wherein the lower suspension part is movable relative to the upper suspension part;
a spring apparatus, wherein the spring apparatus acts between the upper suspension part in the lower suspension part;
a control apparatus;
an actuating element, wherein the actuating element is operable to introduce a force into the device bidirectionally in an operating direction of the spring apparatus, wherein the actuating element includes:
a drive positioned in a space defined between the upper suspension part and the lower suspension part and defined between a plurality of links;
a coupling rod extending through the drive such that the coupling rod and the drive are coaxially aligned and, the coupling rod is drivable by the drive,
wherein the coupling rod is fixedly and non-rotatably connected to lower ends of the plurality of links of a scissor-type support apparatus between the upper suspension part and the lower suspension part, and the coupling rod is fixedly and rotatably connected to the lower suspension part,
wherein a distance between the lower suspension part and the upper suspension part can be varied as a result of a rotation of the coupling rod being rotated by the drive and the plurality of links being entrained in rotation,
wherein the actuating element is actuated via the control apparatus,
wherein the actuating element levels temporary deviations in the distance between the lower and upper suspension parts and actively engages in isolating the oscillations.

11. The device according to claim 10, wherein the drive is a rotary field magnet.

12. The device according to claim 10, wherein the coupling rod is a shaft.

13. The device according to claim 10, wherein the drive rotates the coupling rod in a first direction to decrease the distance between the lower suspension part and the upper suspension part, and the drive rotates the coupling rod in a second direction to increase the distance between the lower suspension part and the upper suspension part.

* * * * *